US 12,128,271 B1

(12) United States Patent
Zeng

(10) Patent No.: US 12,128,271 B1
(45) Date of Patent: Oct. 29, 2024

(54) TREADMILL WITH INTEGRATED BASE AND MANUFACTURING METHOD FOR INTEGRATED BASE

(71) Applicant: Piao Zeng, Yangjiang (CN)

(72) Inventor: Piao Zeng, Yangjiang (CN)

( * ) Notice: Subject to any disclaimer, the term of this patent is extended or adjusted under 35 U.S.C. 154(b) by 0 days.

(21) Appl. No.: 18/598,042

(22) Filed: Mar. 7, 2024

(30) Foreign Application Priority Data

Feb. 16, 2024 (CN) .......................... 202410178859.5

(51) Int. Cl.
| | | |
|---|---|---|
| *A63B 22/00* | (2006.01) | |
| *A63B 22/02* | (2006.01) | |
| *B29C 45/14* | (2006.01) | |
| *B29C 45/42* | (2006.01) | |
| *B29C 45/73* | (2006.01) | |
| *B29K 705/02* | (2006.01) | |
| *B29K 705/12* | (2006.01) | |
| *B29L 31/00* | (2006.01) | |

(52) U.S. Cl.
CPC .......... *A63B 22/0046* (2013.01); *A63B 22/02* (2013.01); *B29C 45/14008* (2013.01); *B29C 45/14336* (2013.01); *B29C 45/42* (2013.01); *B29C 2045/425* (2013.01); *B29C 45/73* (2013.01); *B29K 2705/02* (2013.01); *B29K 2705/12* (2013.01); *B29L 2031/7502* (2013.01)

(58) Field of Classification Search
CPC ................ A63B 22/0046; A63B 22/02; B29C 45/14008; B29C 45/14336; B29C 45/42; B29C 45/73; B29C 2045/425; B29K 2705/02; B29K 2705/12; B29L 2031/7502

See application file for complete search history.

(56) References Cited

U.S. PATENT DOCUMENTS

| | | |
|---|---|---|
| 6,273,842 B1 | 8/2001 | Wang |
| 6,432,026 B1 | 8/2002 | Wang |
| 9,789,355 B1 | 10/2017 | Lo |
| 2007/0232463 A1 | 10/2007 | Wu |

FOREIGN PATENT DOCUMENTS

CN          111840900 A   *  10/2020

* cited by examiner

*Primary Examiner* — Sundhara M Ganesan
*Assistant Examiner* — Jacqueline N L Loberiza
(74) *Attorney, Agent, or Firm* — Jeenam Park

(57) ABSTRACT

The present disclosure provides a treadmill with an integrated base and a manufacturing method for the integrated base, the treadmill includes the integrated base, a running board, a running belt, an electric motor, an electric control, and a drum. The integrated base includes a horizontally and longitudinally arranged support rod that is integrally formed, the support rod is enclosed to form a rectangular base. The horizontally and/or longitudinally arranged support rod is wrapped with a metal member, the integrated base is provided with an installation part for the running board, running belt, electric motor, electric control, and drum. This setting overcomes a shortcoming of a complex structure of the existing treadmill base, eliminates a high production cost of welding assembly, reduces environmental pollution, and requires lower personnel skills. It has the advantages of simple assembly and low manufacturing cost.

8 Claims, 4 Drawing Sheets

TREADMILL WITH INTEGRATED BASE AND MANUFACTURING METHOD FOR INTEGRATED BASE

CROSS-REFERENCE TO RELATED APPLICATIONS

This application claims priority to Chinese Patent Application No. 202410178859.5, filed on Feb. 16, 2024, which is hereby incorporated by reference in its entirety.

TECHNICAL FIELD

The present disclosure relates to the field of treadmill technologies, and in particular, to a treadmill with an integrated base and a manufacturing method for the integrated base.

BACKGROUND

The existing treadmill (or walking machine) consists of a main frame as a base, a running platform installed on the main frame, handrails, and a control platform. The running platform is fixed parallel to the base, thereby forming a walking or running exercise plane.

The main frame of the existing treadmill base is usually composed of two metal crossbeams and a longitudinal beam connecting the two crossbeams, which are connected by welding technology.

An assembly process of the base connected by welding technology is complex and requires skilled welding skills from welding workers. Moreover, differences in welding levels have hindered the automation and standardization of base production.

Therefore, it is necessary to design a treadmill with an integrated base and a manufacturing method for the integrated base to solve the above problems.

SUMMARY

The purpose of the present disclosure is to provide an integrated base treadmill with low pollution, low skill requirements for manufacturing personnel, simple assembly, and low manufacturing cost.

To achieve the above objectives, the present disclosure adopts the following technical solution: a treadmill with an integrated base, including an integrated base, a running board, a running belt, an electric motor, an electric control, and a drum. The integrated base includes a horizontally and longitudinally arranged support rod that is integrally formed, the support rod is enclosed to form a rectangular base. The horizontally and/or longitudinally arranged support rod is wrapped with a metal member, the integrated base is provided with an installation part for the running board, running belt, electric motor, electric control, and drum.

In an implementation mode of the present disclosure, the support rod includes a top plate and two side plates, the top plate and two side plates are provided with reinforcing plates that are cross arranged, the metal member passes through an intersection point of the reinforcing plates.

In an implementation mode of the present disclosure: the support rod is made of plastic material, the metal member is made of steel or aluminum alloy.

In an implementation mode of the present disclosure, a bottom of the base is integrally formed with a support seat.

In an implementation mode of the present disclosure, two ends of the support seat are connected with a reinforced horizontal pipe.

In an implementation mode of the present disclosure, the installation part is provided with an embedded nut.

In an implementation mode of the present disclosure, the drum includes a rotating body and a rotating shaft, the installation part for assembling the drum is provided with an arc-shaped groove configured to embed the rotating shaft; the arc-shaped groove is provided with a threaded hole corresponding to the rotating shaft, the rotating shaft is fixedly connected to the integrated base by a screw.

In an implementation mode of the present disclosure, a motor fixing seat is embedded in the installation part configured to install the motor, an outside the motor fixing seat is fixedly provided with a motor support platform by a screw.

To achieve the above objectives, the present disclosure adopts the following technical solution for a manufacturing method for the integrated base, including the steps of:

S1: placing the metal member into a fixture; automatically lowering the metal member from the fixture by a robotic arm and placing it into a base mold;

S2: closing the base mold, injecting liquid plastic material into the mold, maintaining pressure after injection is completed;

S3: after the pressure is maintained, adding materials and cooling down;

S4: after cooling to room temperature, opening the base mold and demolding the base;

S5: taking out a formed base with the robotic arm.

From the above technical solutions, it can be seen that the integrated base structure of the present disclosure overcomes shortcomings of a complex structure of the existing treadmill base, eliminates a high production cost of welding assembly, reduces environmental pollution, and has low skill requirements for personnel. It has the advantages of simple assembly and low manufacturing cost.

DESCRIPTION OF EMBODIMENTS

In order to clarify the purpose, technical solution, and advantages of the present disclosure, a detailed description of the present disclosure will be provided below in combination with the drawings and specific embodiments.

Figure 1:
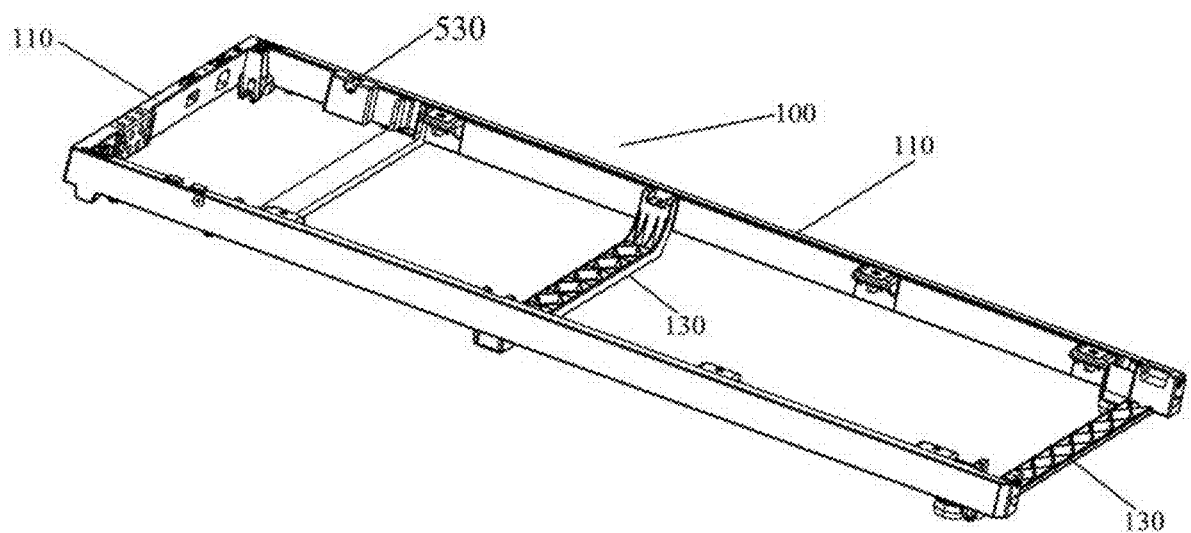
FIG. 1 is a schematic diagram of an integrated base of the present disclosure.
Figure 2:
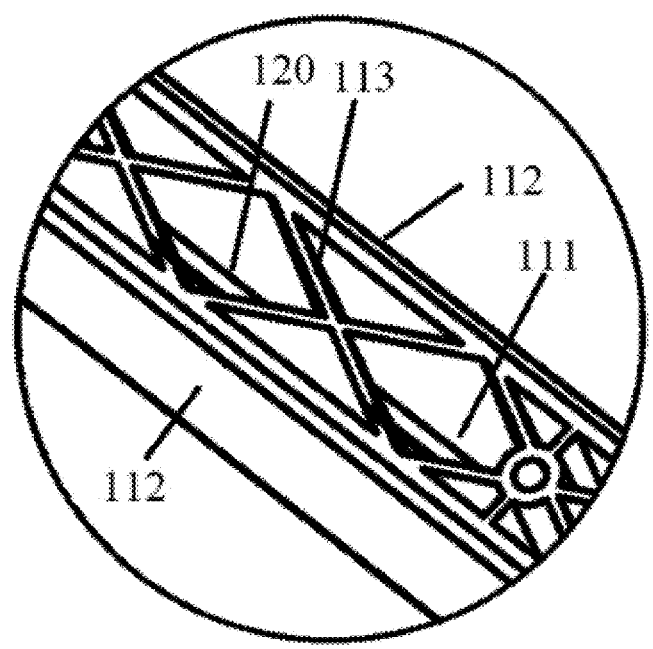
FIG. 2 is a partial enlarged view of the integrated base of the present disclosure.
Figure 3:
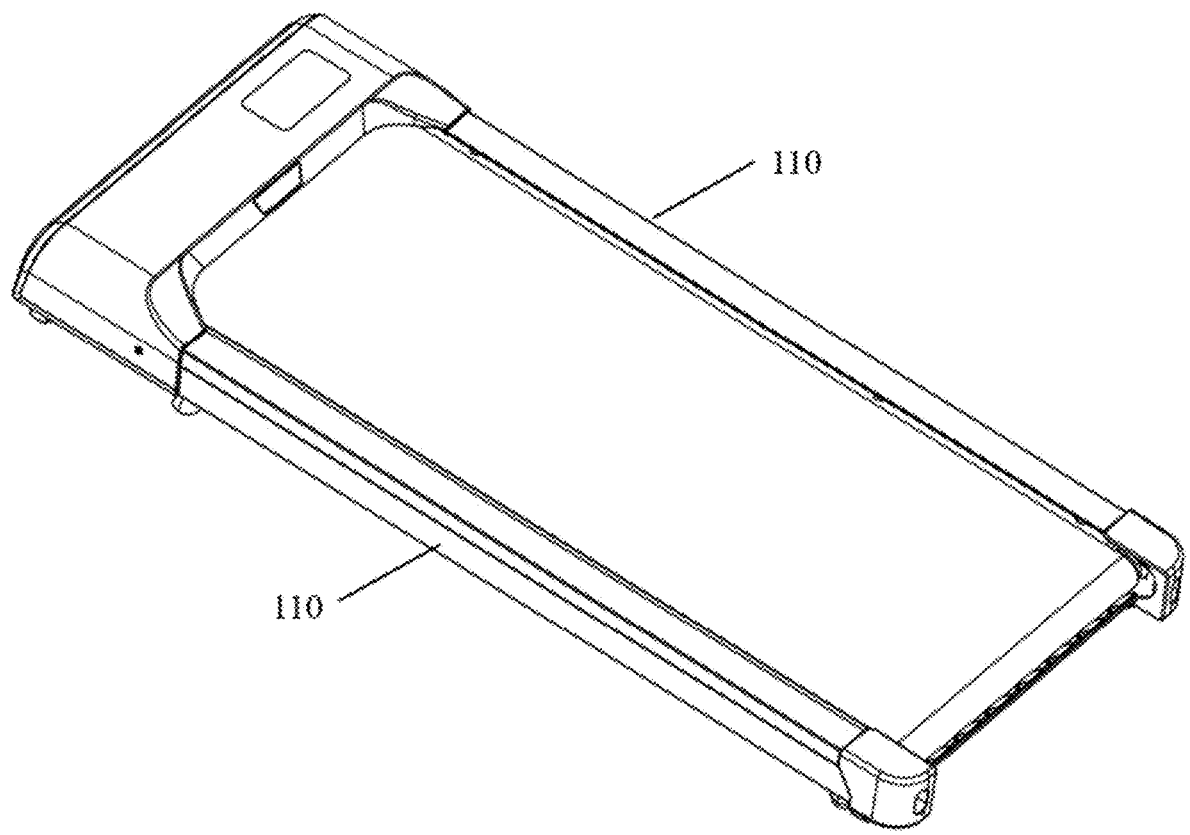
FIG. 3 is a schematic diagram of a treadmill with the integrated base of the present disclosure.
Figure 4:
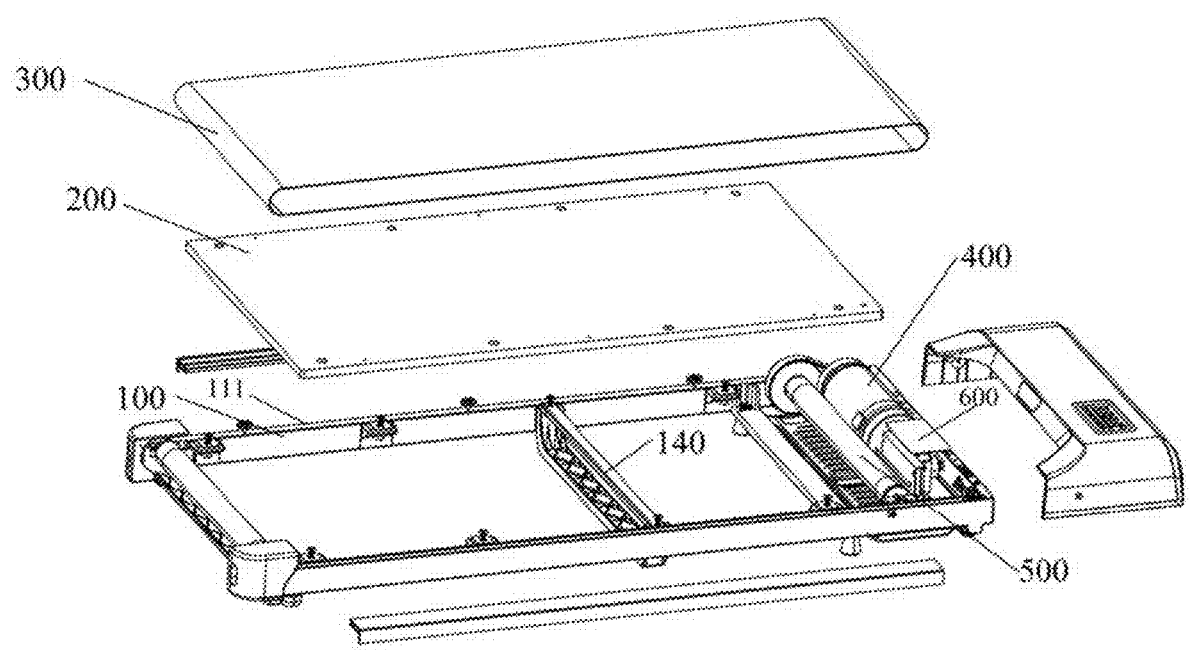
FIG. 4 is an exploded view of the treadmill with the integrated base of the present disclosure.
Figure 5:
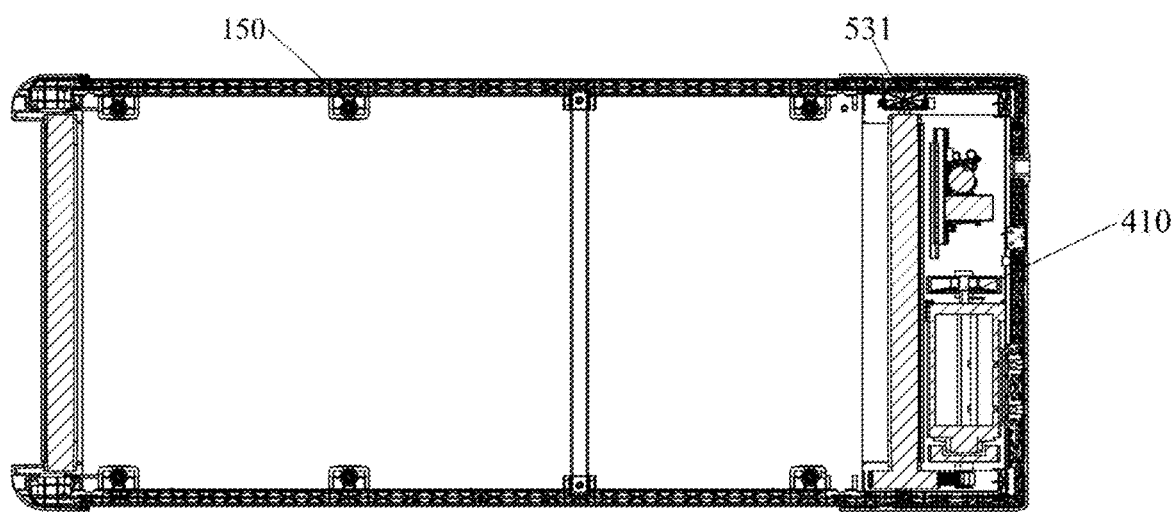
FIG. 5 is a sectional view of the treadmill with the integrated base of the present disclosure.
Figure 6:
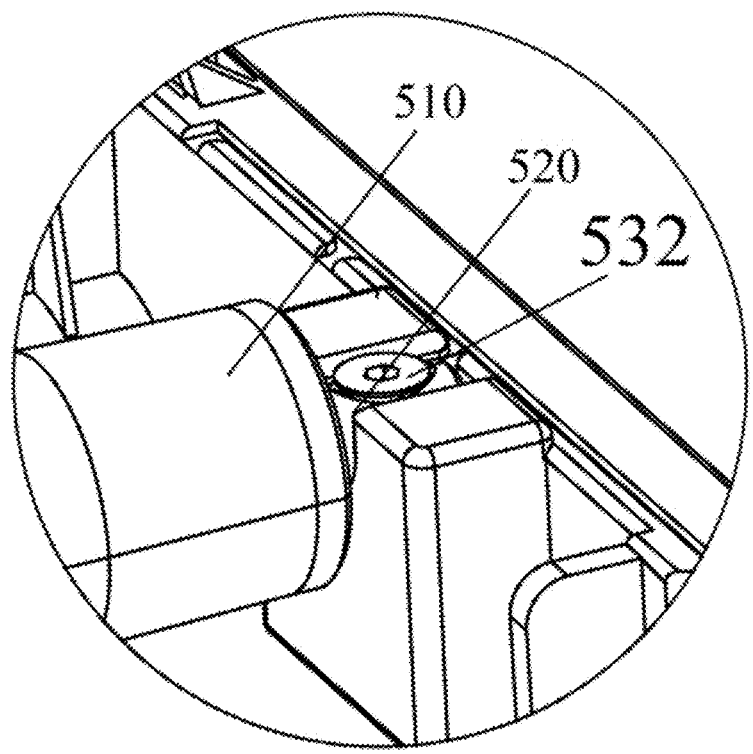
FIG. 6 is an installation schematic diagram of a drum of the treadmill with the integrated base of the present disclosure.
Figure 7:
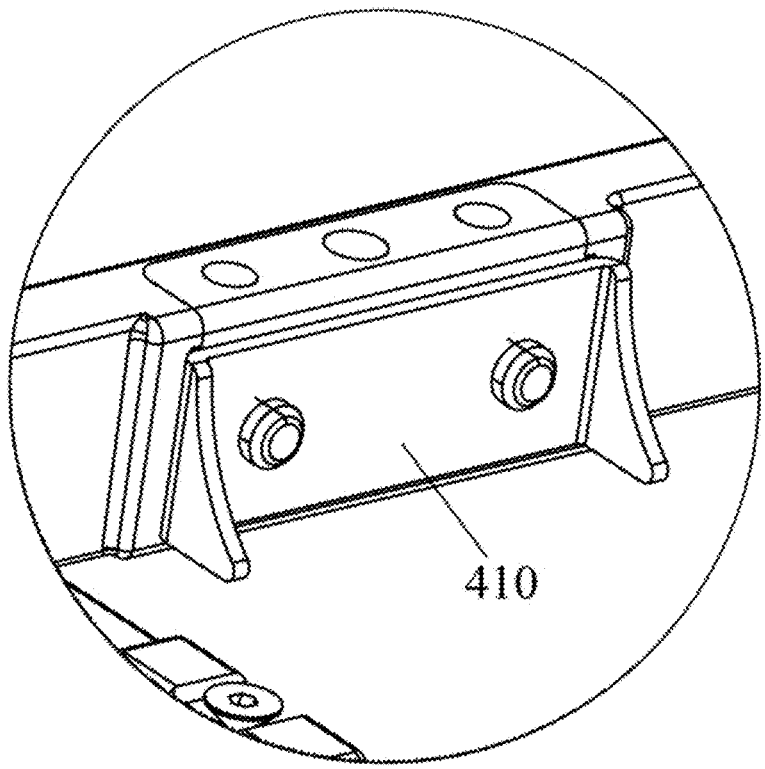
FIG. 7 is a schematic diagram of a motor support platform of the treadmill with the integrated base of the present disclosure.

As shown in FIGS. 1-7, the present disclosure provides a treadmill with an integrated base, including an integrated base 100, a running board 200, a running belt 300, an electric motor 400, an electric control 600, and a drum 500. The integrated base 100 includes a horizontally and longitudinally arranged support rod 110 that is integrally formed, the support rod 110 is enclosed to form a rectangular base 100. It can be understood that according to a length, the support rod 110 can be divided into a long support rod and a short support rod. The horizontal and/or vertical support rod 110 is wrapped with a metal member 120, which increases a support strength of the support rod 120 and can avoid huge deformation of the support rod 110 under pressure. The integrated base 100 is provided with an installation part for the running board 200, running belt 300, electric motor 400, electric control 600, and drum 500, rendering it easy to assemble into a complete treadmill. The integrated base overcomes drawbacks of a complex structure of existing treadmill bases, eliminates a high production cost of welding assembly, reduces environmental pollution, and has low skill requirements for personnel. It has advantages of simple assembly and low manufacturing cost. It can be understood that the integrated base can also be applied to a walker with similar functions.

In this embodiment, the support rod 110 includes a top plate 111 and two side plates 112. The top plate 111 and the two side plates 112 are provided with reinforcing plates 113 that are cross arranged, the metal member 120 passes through an intersection point of the reinforcing plates 113. The reinforcement plates 113 allow the support rod 110 to use fewer manufacturing materials to save costs while maintaining the same support strength, and it is also more convenient for injection molding.

In this embodiment, the support rod 110 is made of plastic material, the metal piece 120 is made of steel or aluminum alloy, and in an implementation mode, the metal member is aluminum alloy. Therefore, compared to traditional pure steel bases, the weight of the present disclosure is lighter, and the manufacturing cost is lower.

In this embodiment, a bottom of the base 100 is integrally formed with a support seat 130. It can be understood that the support seat 130 is provided between two parallel support rods 110 with a longer length, which can avoid the problem of insufficient support strength in a middle of the support rod 110 due to the length being too long.

In this embodiment, two ends of the support seat 130 are connected with a reinforced horizontal pipe 140 to increase the support strength of the integrated base 100.

In this embodiment, the installation part is provided with an embedded nut 150. It can be understood that the integrated base 100 is manufactured using injection molding technology, and the embedded nut 150 is embedded during an injection molding process, simplifying an assembly process, and avoiding a possibility of inaccurate alignment during assembly.

In this embodiment, the drum 500 includes a rotating body 510 and a rotating shaft 520. The installation part configured to assemble the drum 500 is provided with an arc-shaped groove 530 configured to embed the rotating shaft 520. The arc-shaped groove 530 is provided with a threaded hole 531 corresponding to the rotating shaft. The rotating shaft is fixedly connected to the integrated base by a screw 532 to facilitate modular assembly of the treadmill.

In this embodiment, the installation part configured to install the motor 200 is embedded with a motor fixing seat 410, an outside of the motor fixing seat 410 is fixedly provided with a motor support platform 210 by a screw 532 to support and reduce vibration of the motor.

The manufacturing method of the integrated base structure of a treadmill, with specific steps as follows:

S1: placing the metal member into a fixture; automatically lowering the metal member from the fixture by a robotic arm and placing it into a base mold;

S2: closing the base mold, injecting liquid plastic material into the mold, maintaining pressure after injection is completed;

S3: after the pressure is maintained, adding materials and cooling down;

S4: after cooling to room temperature, opening the base mold and demolding the base;

S5: taking out a formed base with the robotic arm.

The terms used in this specification, such as "up", "down", "front", "back", etc., to represent spatial relative positions are for a purpose of illustration to describe the relationship between one feature and another as shown in the drawings. It can be understood that depending on the placement of the product, the term relative spatial position can be intended to include different orientations other than those shown in the drawings, and should not be understood as a limitation on the claims.

In addition, the above embodiments are only used to illustrate the present disclosure and not to limit the technical solutions described herein. The understanding of this specification should be based on those skilled in the art. Although this specification has provided detailed explanations of the present disclosure with reference to the above embodiments, ordinary technical personnel in this field should understand that, technicians in the relevant technical field can still modify or replace the present disclosure, and all technical solutions and improvements that do not deviate from the spirit and scope of the present disclosure should be covered within the scope of the claims of the present disclosure.

What is claimed is:

1. A treadmill with an integrated base, comprising the integrated base, a running board, a running belt, an electric motor, an electric control, and a drum;
   the integrated base comprises a horizontally arranged support rod and a couple of longitudinally arranged support rods that are integrally formed, a rectangular base is formed by the horizontally arranged support rod and the couple of longitudinally arranged support rods; and at least one metal member is integrated within the horizontally arranged support rod and/or the couple of longitudinally arranged support rods, the integrated base is provided with a first installation part for the drum and a second installation part for the electric motor.

2. The treadmill with the integrated base as claimed in claim 1, wherein the horizontally arranged support rod and the couple of longitudinally arranged support rods comprise a top plate and two side plates, the top plate and the two side plates are provided with reinforcing plates that are cross arranged, the metal member passes through an intersection point of the reinforcing plates.

3. The treadmill with the integrated base as claimed in claim 2, wherein the horizontally arranged support rod and the couple of longitudinally arranged support rods are made of plastic material, the metal member is made of steel or aluminum alloy.

4. The treadmill with the integrated base as claimed in claim 3, wherein a bottom of the base is integrally formed with a support seat.

5. The treadmill with the integrated base as claimed in claim 4, wherein two ends of the support seat are connected with a reinforced horizontal pipe.

6. The treadmill with the integrated base as claimed in claim 1, wherein the installation part is provided with an embedded nut.

7. The treadmill with the integrated base as claimed in claim 1, wherein the drum comprises a rotating body and a rotating shaft, the first installation part for assembling the drum is provided with an arc-shaped groove configured to embed the rotating shaft; the arc-shaped groove is provided with a threaded hole corresponding to the rotating shaft, the rotating shaft is fixedly connected to the integrated base by a screw.

8. The treadmill with the integrated base as claimed in claim 1, wherein a motor fixing seat is embedded in the second installation part configured to install the motor, an outside the motor fixing seat is fixedly provided with a motor support platform by a screw.

\* \* \* \* \*